United States Patent
Osawa et al.

(10) Patent No.: US 8,599,655 B2
(45) Date of Patent: Dec. 3, 2013

(54) NEAR FIELD LIGHT GENERATOR, OPTICAL RECORDING HEAD AND OPTICAL RECORDING APPARATUS

(75) Inventors: Kou Osawa, Amagasaki (JP); Hiroshi Hatano, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 51 days.

(21) Appl. No.: 13/125,914

(22) PCT Filed: Sep. 4, 2009

(86) PCT No.: PCT/JP2009/065491
§ 371 (c)(1),
(2), (4) Date: Apr. 25, 2011

(87) PCT Pub. No.: WO2010/050299
PCT Pub. Date: May 6, 2010

(65) Prior Publication Data
US 2011/0205866 A1    Aug. 25, 2011

(30) Foreign Application Priority Data
Oct. 28, 2008  (JP) .................................. 2008-276629

(51) Int. Cl.
*G11B 11/00*    (2006.01)
(52) U.S. Cl.
USPC ...................................................... 369/13.33
(58) Field of Classification Search
None
See application file for complete search history.

(56) References Cited

U.S. PATENT DOCUMENTS

| | | | |
|---|---|---|---|
| 2007/0230323 A1* | 10/2007 | Nishida et al. | 369/275.4 |
| 2008/0080824 A1* | 4/2008 | Park et al. | 385/127 |
| 2008/0204916 A1* | 8/2008 | Matsumoto et al. | 360/59 |

FOREIGN PATENT DOCUMENTS

| | | |
|---|---|---|
| JP | 2000-173093 | 6/2000 |
| JP | 2003-272103 | 9/2003 |
| JP | 2005-116155 | 4/2005 |
| JP | 2006-323989 | 11/2006 |
| JP | 2007-310958 | 11/2007 |

\* cited by examiner

*Primary Examiner* — Adam R Giesy
*Assistant Examiner* — Henok Heyi
(74) *Attorney, Agent, or Firm* — Finnegan, Henderson, Farabow, Garrett & Dunner, L.L.P.

(57) ABSTRACT

Provided is a near field light generator to be utilized, effectively generating near field light with respect to a recording medium. Thus, disclosed is a near field light generator possessing a waveguide comprising a core and a cladding brought into contact with the core, to guide light having an electric field component perpendicular to an interface between the core and the cladding, and a metallic structure body provided on an outputting end face onto which light of the waveguide is output, to generate near field light by receiving light guided by the waveguide, wherein the metallic structure body is placed straddling the core and the cladding on the outputting end face in such a way that the metallic structure body receives the electric field component protruding from the interface to the cladding.

6 Claims, 12 Drawing Sheets

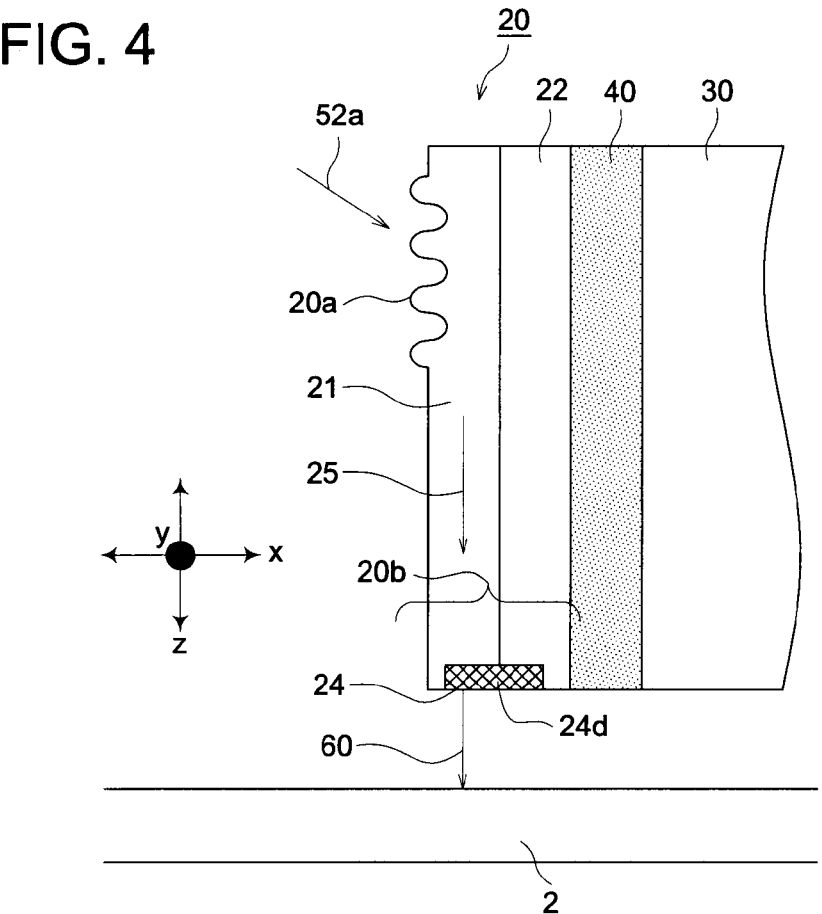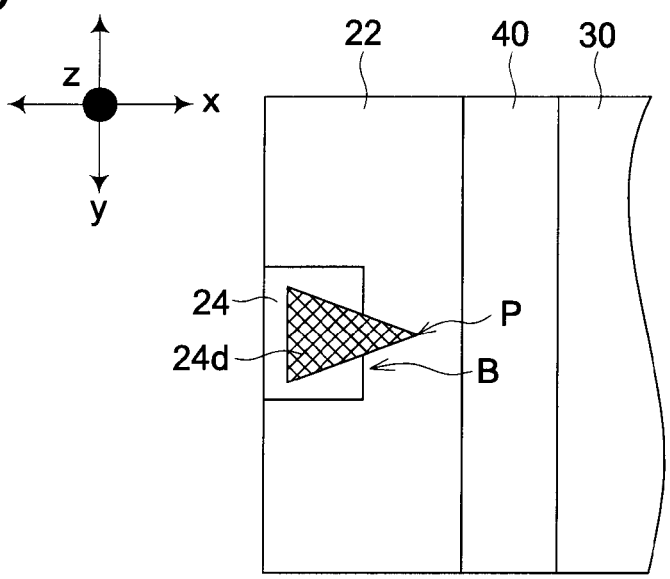

NEAR FIELD LIGHT GENERATOR, OPTICAL RECORDING HEAD AND OPTICAL RECORDING APPARATUS

TECHNICAL FIELD

The present invention relates to a near field light generator, an optical recording head and an optical recording apparatus.

BACKGROUND

In the case of a magnetic recording system, when the recording density becomes high, magnetic bits tend to undergo influence of external temperature or the like. This requires use of a recording medium having a high coercive force, but when using such a recording medium, a magnetic field applied during recording becomes also high. The upper limit of magnetic field generated from the magnetic head is determined by the saturation magnetic flux density, but a magnetic field thereof approaches the material limitation value, whereby no drastic increase can be expected. Herein, proposed is a system in which stability in recorded magnetic bit is secured when heating is applied locally during recording to reduce the magnetization, and recording is performed when the coercive force becomes small, followed by termination of heating via naturally cooling. This system is called a thermally assisted magnetic recording system.

In the case of the thermally assisted magnetic recording system, it is preferred that a recording medium is instantaneously heated. For this reason, heating is conventionally conducted by utilizing absorption of light, and a system in which light is utilized for heating is called an optically assisted magnetic recording system.

In the optically assisted magnetic recording system, a light spot can be reduced in size by using waveguides having high relative refractive index differences, but the light spot can only be reduced to a limited degree of roughly λ (wavelength of light to be used)/n (refractive index). For this reason, the optically assisted magnetic recording system can not be applied sufficiently to a light spot of roughly 20 nm desired to be used for very high density recording. In contrast, there is a method of using near field light as a method of further reducing a light spot in size. The light spot diameter obtained from the near field light is determined mainly by the nose shape of a sharpened fine metallic structure body (called a plasmon probe), and the diameter can be applied for the very high density recording at several tens of nanometers in size.

Patent Document 1 has disclosed recording head which generates near field light via collection of laser light to a metal pin by a wave guide (Planar Solid Immersion Mirror, also referred to as PSIM), for example.

It is disclosed in Patent Document 2 that concerning a plasmon probe, the size is arranged to be smaller than an exposure light spot, and material, shape and dimension of the plasmon probe are designed so as to generate plasmon resonance to operate a near field light generator exhibiting high resolution and high efficiency.

PRIOR ART DOCUMENT

Patent Document

Patent Document 1: Japanese Patent Open to Public Inspection (O.P.I.) Publication No. 2005-116155

Patent Document 2: Japanese Patent O.P.I. Publication No. 2006-323989

DISCLOSURE OF THE INVENTION

Problems to be Solved by the Invention

However, it is disclosed in Patent Documents 1 and 2 that the position where near field light is generated is located in a core, or on the extended portion. For this reason, the near field light is designed to be generated via action of only light passing through the core, whereby there has appeared a problem such that the efficiency of generating near field light is insufficient.

The present invention has been made on the basis of the above-described situation, and it is an object of the present invention to provide a near field light generator, an optical recording head and an optical recording apparatus by which near field light can be efficiently generated and utilized at a time when recording is conducted on a recording medium.

Means to Solve the Problems

The above-described problem can be solved by the following structures.

(Structure 1) A near field light generator comprising a waveguide comprising a core and a cladding brought into contact with the core, to guide light comprising an electric field component perpendicular to an interface between the core and the cladding, and a metallic structure body provided on an outputting and face onto which light of the waveguide is output, to generate near field light by receiving light guided by the waveguide, wherein the metallic structure body is placed straddling the core and the cladding on the outputting end face in such a way that the metallic structure body receives the electric field component protruding from the interface to the cladding.

(Structure 2) The near field light generator of Structure 1, wherein relative refractive index difference Δ between refractive index $n_{core}$ of a material constituting the core and refractive index $n_{cladding}$ of a material constituting the cladding, represented by the following Formula, is 0.25 or more: $\Delta=(n_{core}^2-n_{cladding}^2)/(2\times n_{core}^2)$.

(Structure 3) The near field light generator of Structure 1 or 2, wherein the waveguide comprises a light spot size converter to make a light spot on an output side of the waveguide to be smaller in size than another light spot on an incident side of the waveguide.

(Structure 4) The near field light generator of any one of Structures 1-3, wherein the metallic structure body comprises a sharpened portion in its shape, the sharpened portion placed in such a way that the sharpened portion is present in the cladding.

(Structure 5) The near field light generator of Structure 4, wherein the metallic structure body is in the form of a triangle, and placed in such a way that the triangle comprises an apex present in the cladding, and an opposite side facing the apex is present in the core.

(Structure 6) An optical recording head comprising the near field light generator of any one of Structures 1-5 placed to provide near field light to a magnetic recording medium, and a magnetic recording section placed to conduct magnetic recording onto the magnetic recording medium to which the near field light is provided by the near field light generator, wherein the metallic structure body is placed straddling from the core to a cladding on a side where the magnetic recording section is located.

(Structure 7) An optical recording apparatus comprising the optical recording head of Structure 6, a light source emitting light coupled with the waveguide, a magnetic recording medium, and a control section to conduct controlling for magnetic recording onto the magnetic recording medium with the optical recording head.

Effect of the Invention

In a near field light generator, an optical recording head and an optical recording apparatus in the present invention, the near field light is generated by utilizing an electric field component straying into a cladding with respect to light guided by waveguides, whereby the near field light can be efficiently generated and utilized.

BRIEF DESCRIPTION OF THE DRAWINGS

FIG. 4 shows a cross-sectional view of a planar optical element.

FIG. 5 shows a bottom view of a planar optical element.

DESCRIPTION OF THE PREFERRED EMBODIMENTS

Next, on the basis of an optically assisted magnetic recording head possessing a magnetic recording section provided in an optical recording head as embodiments shown in the figures, and an optical recording apparatus equipped with the optically assisted magnetic recording head, the present invention will be described, but it is not limited to the embodiments. The optical recording head in the present embodiment can be applied for no magneto-optical recording medium but an optical recording medium. Incidentally, repetitive explanation will be appropriately omitted by providing the same symbols and numerals for the mutually identical or corresponding sections in each embodiment.

Figure 1:
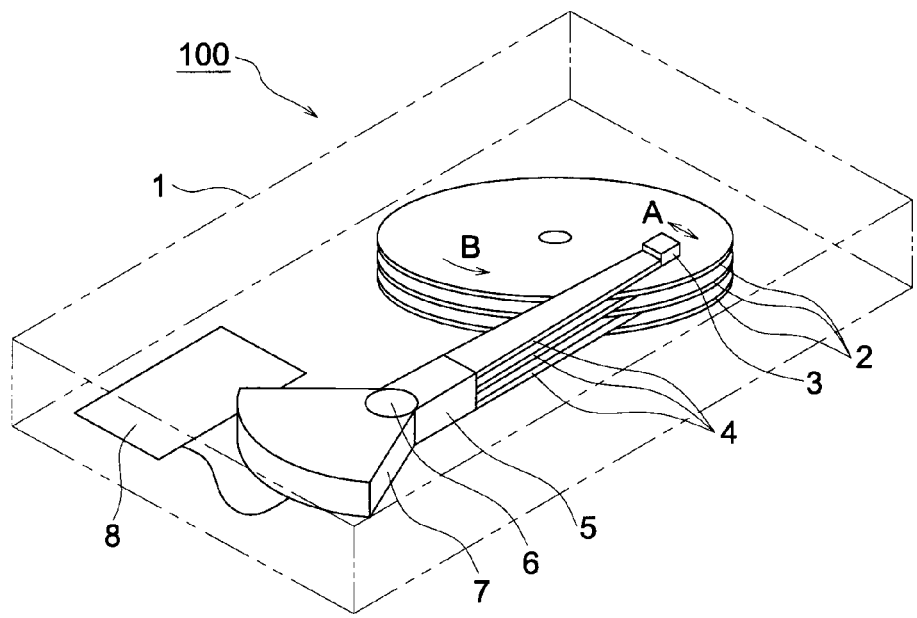
FIG. 1 shows a schematic configuration diagram of an optical recording apparatus equipped with an optically assisted magnetic recording head in an embodiment of the present invention.

An outline configuration of an optical recording apparatus (for example, a hard disk drive) equipped with an optically assisted magnetic recording head in an embodiment of the present invention is shown in FIG. 1. Optical recording apparatus 100 possesses the following (1)-(6) in enclosure 1.

(1) Recording disk (recording medium) 2
(2) Suspension 4 supported by arm 5 provided rotatably in the direction of arrow A (tracking direction) by setting supporting axis 6 as a supporting point
(3) Tracking actuator 7 attached to arm 5
(4) Optically assisted magnetic recording head (hereinafter, referred to as optical recording head 3) attached to an end portion of suspension 4 via connecting member 4a
(5) A motor (unshown) to rotate disk2 in the direction of arrow B
(6) Tracking actuator 7, a motor, and control section 8 to control optical recording head 3 generating a magnetic field, and irradiated light in response to writing information for recording onto disk 2.

Optical recording apparatus 100 is designed to be made in such a way that optical recording head 3 is relatively movable while it is floating over disk 2.

Figure 2:
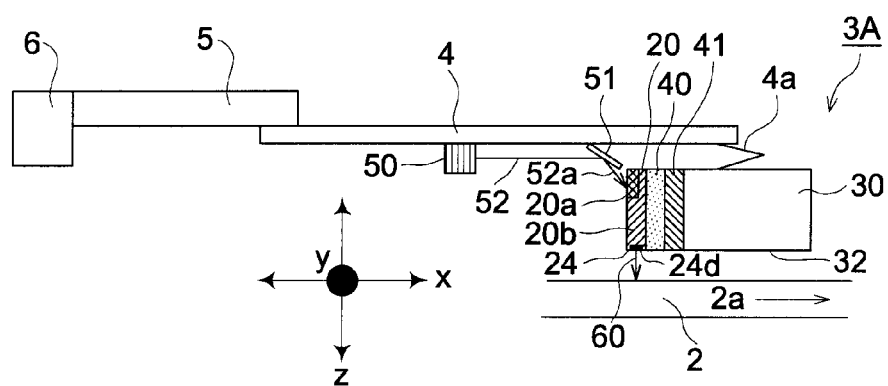
FIG. 2 shows a cross-sectional view of an optical recording head.

FIG. 2 conceptually shows the peripheral area of optical recording head 3A for writing and recording from the lateral face as an example of optical recording head 3 utilizing light for information recording with respect to disk 2. Optical recording head 3A possesses slider 30; planar optical element 20 fitted with diffraction grating 20a and waveguide 20b; plasmon probe 24d as a fine metallic structure body generating near field light, which is provided on the light-outputting end face of waveguide 20b; magnetic recording section 40; and so forth.

Slider 30 is relatively moved with respect to disk 2 while the slider is floated, but contacting may occur in cases where dust attached onto disk 2 or defects are existing on disk 2. In this case, it is preferred to use a hard material exhibiting wear resistance as a material of slider 30 in order to reduce the wear to be generated. A ceramic material containing $Al_2O_3$, AlTiC, zirconia, TiN or the like, for example, may be employed. Further, as a wear resistance treatment, on the surface on the disc 2 side of slider 30 may be subjected to a surface treatment to improve a wear resistance property. For example, when using a DLC (diamond like carbon) coating layer, not only high transmittance of near-infrared light is obtained, but also a hardness Hv of 3000 or more after diamond is obtained.

Further, the surface of slider 30 facing disk 2 possesses air bearing surface 32 (referred to also as ABS) to improve a floating property.

Light source 50 is a laser element, for example, and secured to suspension 4. Light source 50 may be an outputting end portion of an optical fiber with which light from the laser element is introduced, and may also be one used in combination with an optical system equipped with a plurality of lenses. Light 52 output from source 50 is parallel light, and enters (couples) diffraction grating 20a provided in planar optical element 20. From light source 50, incident is parallel light having an electric field component in the specified direction to diffraction grating 20a (referred to also as a grating coupler).

Light 52 output from light source 50 is deflected at minor 51. Deflected light 52a enters diffraction grating 20a at a predetermined incident angle so as to efficiently couple diffraction grating 20a.

Light entering diffraction grating 20a has the vibration direction of electric field on the X-Z plane in FIG. 2. For this reason, light having the electric field component in the direction perpendicular to the interface between a core and cladding in wave guide 20b is coupled with waveguide 20b.

Planar optical element 20 possesses diffraction grating 20a which light enters, and waveguide 20b composed of a core and a cladding to output light by guiding incident light.

Light coupled with diffraction grating 20a is coupled with waveguide 20b to travel apical surface 24 of planar optical element 20. Plasmon probe 24d placed at the tip of planar optical element 20 is exposed to light passing through waveguide 20b. Plasmon probe 24d having been exposed to light generates near field light 60. Generally, the near field light is light localized in the range of not more than wavelength of light, but since a floating amount of a slider is very small, for example, not more than 10 nm, the magnetic recording medium of disk 2 is sufficiently heated by near field light 60. Further, since light spot size of the near field light generated by the plasmon probe is determined depending on size of the nose shape of the plasmon probe, and can be set to several tens of nanometers or less, it is suitable in size for an optically assisted magnetic recording as a very high density recording of 1 T bit/in$^2$ or more.

When disk 2 is exposed to near field light 60 as a light spot, temperature of a portion on disk 2 having exposed to light is temporarily increased, whereby coercive force of disk 2 is lowered. Magnetic information is written to the portion having been exposed to light, which is in the state where the coercive force has been lowered, by magnetic recording section 40.

In addition, in FIG. 2, in the direction of the exit side from the entrance side (in the direction of arrow 2a in the figure) of a recording region on disk 2, planar optical element 20 and magnetic recording section 40 are provided in order. When the exit side of planar optical element 20 is located right behind magnetic recording section 40, it is preferable to be able to write before too much cooling the recorder region having been subjected to heating. Further, magnetic reproducing section 41 to read out magnetic recording information written on disk 2 is provided on the exit side of magnetic recording section 40. This magnetic reproducing section 41 may be provided on the entrance side of planar optical element 20.

Figure 3:
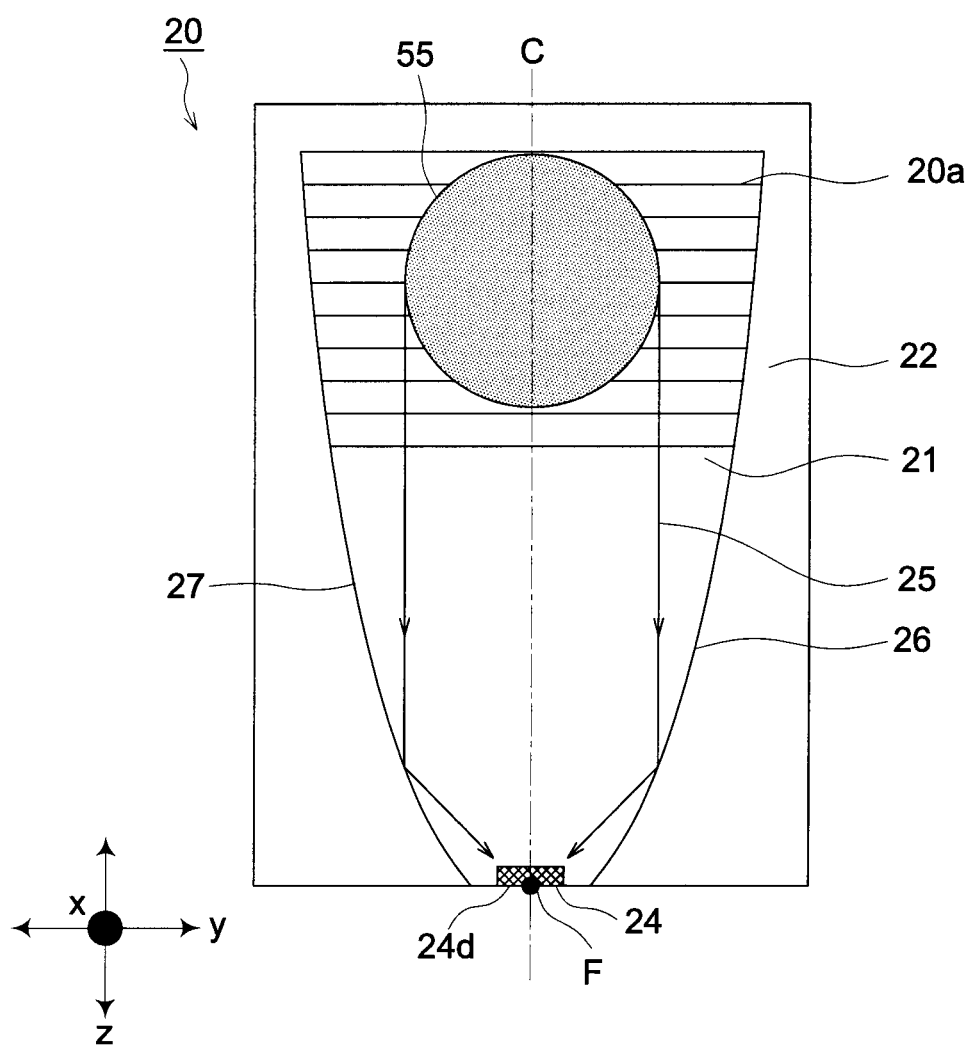
FIG. 3 shows a front view of a planar optical element.

Planar optical element 20 will be described. A front view and a cross-sectional view of planar optical element 20 are schematically shown in FIG. 3 and FIG. 4, respectively. Planar optical element 20 possesses core 21 and cladding 22 constituting a waveguide, and diffraction grating 20a as a light input section is formed in core 21.

In FIG. 3, light 52a entering diffraction grating 20a is represented by light spot 55. Diffraction grating 20a is composed of a plurality of grooves parallel to the directrix of a parabola as a form of side surfaces 26 and 27 of core 21.

Waveguide 20b is composed of a plurality of layers each made of a different refractive index, and core 21 has a larger refractive index than that of cladding 22. Light coupled with diffractive grating 20a is trapped inside core 21 because of this refractive index difference; travels in the direction of arrow 25; and reaches apical surface 24. In addition, as to the side where cladding 22 of core 21 is present, and the opposite side, air serves as a cladding.

Core 21 is formed of $Ta_2O_5$, $TiO_2$, ZnSe or the like, and may have a thickness of about 20 nm to 500 nm. Further, cladding 22 is formed of $SiO_2$, air, $Al_2O_3$ or the like, and may have a thickness of about 200 nm to 2000 nm.

Core 21 has side surfaces 26 and 27 where the contour shape of the peripheral surface is a parabola formed in such a way that light coupled with diffraction grating 20a is reflected toward focal point F. In FIG. 3, a symmetrical central axis of the parabola is represented by axis C (a line passing through focal point F, which is perpendicular to the directrix (unshown), and a focal point of a parabola is represented by focal point F. A reflection material such as gold, silver, aluminum or the like may be provided on the side surfaces 26 and 27 to reduce light loss by reflection.

Since waveguide 20b fitted with core 21 having side surface 26 and 27 whose contour shape of the peripheral surface is a parabola collects a widely expanded light spot coupled with diffraction grating 20a to focal point F, it appears that the light spot is converted into a small spot in size.

Core 21 of waveguide 20b having planar shape seemingly obtained by cutting off a tep of a parabola possesses apical surface 24 facing disk 2. Since light emitted from focal point F is rapidly expanded, focal point F can be placed closer to disk 2 when shape of apical surface 24 is designed to be a flat surface. In the present embodiment, focal point F is formed on apical surface 24.

In FIG. 5, shown is the situation where plasmon probe 24d is placed on apical surface 24, and this placement is observed from the disk 2 side. Triangle-shaped plasmon probe 24d shown in FIG. 5, whose base portion is in core 21 and whose sharpest-pointed portion (tip P) is in cladding 22, is placed straddling core 21 and cladding 22. Further, since waveguide 20b is coupled with light having an electric field component perpendicular to interface B between core 21 and cladding 22, light irradiating plasmon probe 24d after passing through core 21 has become light (TM wave) having an electric field component in the x direction perpendicular to interface B between core 21 and cladding 22.

Concerning near field light generated by plasmon probe 24d, the place near tip P generating light having the strongest intensity can be set to the place located beyond the cladding 22 side. For this reason, since strong near field light can be placed closer to magnetic recording section 40 than core 21, this has an advantage in magnetic recording performed by heating disk 2 with near field light Further, since peripheral light passing through the place near plasmon probe 24d after passing through core 21 and near field light generated in the vicinity of tip P are not overlapped, the peripheral light does not adversely affect recording onto disk 2.

Action of light to a plasmon probe in cases where light having an electric field component in the predetermined direction is coupled with waveguide 20b will be described in detail.

Figure 6A:
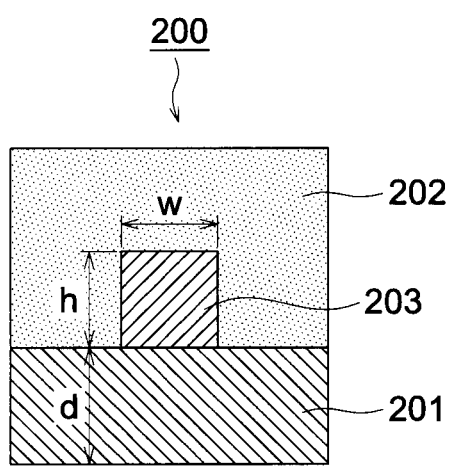
FIGS. 6a and 6b each area diagram showing a light-outputting end face of a waveguide for analysis.
Figure 6B:
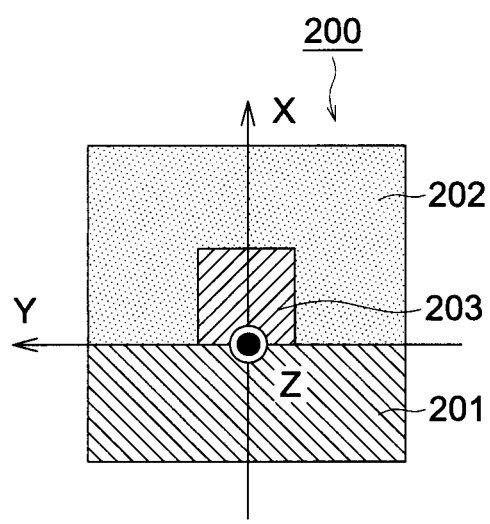

As an example to describe an electric field distribution at the tip of a waveguide, waveguide 200 is shown in FIG. 6a. Waveguide 200 is composed of substrate 201 as a lower portion cladding, prismatic column shaped core 203, and upper portion cladding 202. The core width of core 203, the core height and the substrate thickness are represented by w, h and d, respectively, and FIG. 6b shows a coordinate system for explanation. The axis (perpendicular to the paper sheet) passing through the center of the interface between substrate 201 and core 203 is represented by Z-axis; the axis parallel to the interface, passing through Z=0 is represented by Y-axis; and the axis perpendicular to the interface, passing through Z=0 is represented by X-axis, provided that the position where the apical surface of waveguide 200 and the Z-axis are intersected is set to Z=0.

When running waveguide 20b having been described so far with waveguide 200, substrate 201, core 21 and cladding 22 correspond to air, core 203 and upper portion cladding 202, respectively. It appears that core width w of core 203 corresponds to the width of core 21 of apical surface 24 in waveguide 20b, and core height h of core 203 corresponds to core 21.

Herein, refractive indices of core 203, upper portion cladding 202 and substrate (lower portion cladding) 201 are designated as $n_{core}$, $n_{cladding}$ and $n_{sub}$, respectively, and relative refractive index difference Δ exhibiting characteristics of waveguide 200 is defined by the following Formula (1).

$$\Delta = (n_{core}^2 - n_{cladding}^2)/(2 \times n_{core}^2) \quad (1)$$

Specific material to constitute waveguide 200 and its refractive index are shown below in a form of "material (refractive index)". In the ranges of a wavelength of 1.5 μm and a wavelength of 1.3 μm as communication wavelength ranges, Si (3.48) as a material constituting core 203, and SiOx (1.43-3.48), Al$_2$O$_3$ (1.8) or the like as a material constituting cladding (upper portion cladding 202 and substrate 201) are provided, whereby relative refractive index difference Δ can be designed to be roughly 0.001-0.42. Further, in a wavelength of 400-800 nm as a visible range, GaAs (3.3), Si (3.7) or the like as a material constituting core 203, and Ta$_2$O$_5$ (2.5) or SiOx (1.4-3.7) as a material constituting a cladding can be utilized, whereby relative refractive index difference Δ can be designed to be roughly 0.001-0.41. Those are limited to the material exemplified here, and when materials such as TiO$_2$, SiN, ZnSe and so forth are used in combination, and a photonic crystal structure or the like is employed to vary refractive index in structure, specific reference index difference Δ is 0-0.5.

Mode field diameter (MFD) of light irradiating a plasmon probe so as to efficiently generate near field light is preferably about 0.5 μm, for example. In order to reduce the mode field diameter to about 0.5 μm, a waveguide having a refractive index of material constituting core 203 is 3.5 at a wavelength of 1.5, and a relative refractive index difference Δ of about 0.4 was assumed to analyze an electric field distribution.

Si ($n_{core}$=3.48) as a material constituting core 203, SiOx ($n_{cladding}$=1.465) as a material constituting upper portion cladding 202, and SiO$_2$ ($n_{sub}$=1.44) as a material constituting substrate (lower portion cladding) 201 were arranged to be set as specific examples for analysis. Core width w and core height h were set to w=h=300 nm.

When a relative refractive index difference Δ of 0.411 is obtained via calculation from the above-described refractive index, and the electric field oscillation of light coupled with wavelength 200 is set to the X-axis direction shown in FIG. 6b, light irradiating the plasma probe is to be mainly composed of X component (Ex) and Z component (Ez) of the electric field.

Figure 7A:
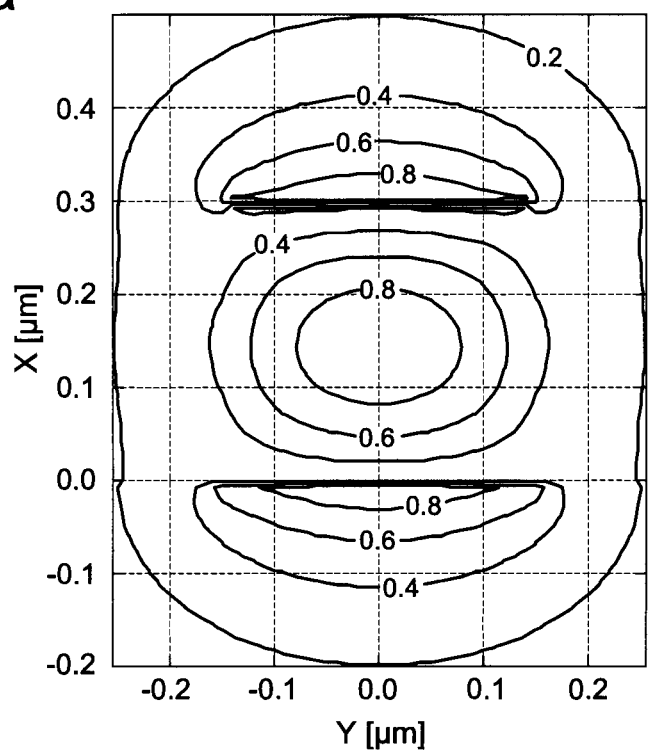
FIGS. 7a and 7b each are a diagram showing an intensity distribution of electric field Ex.
Figure 7B:
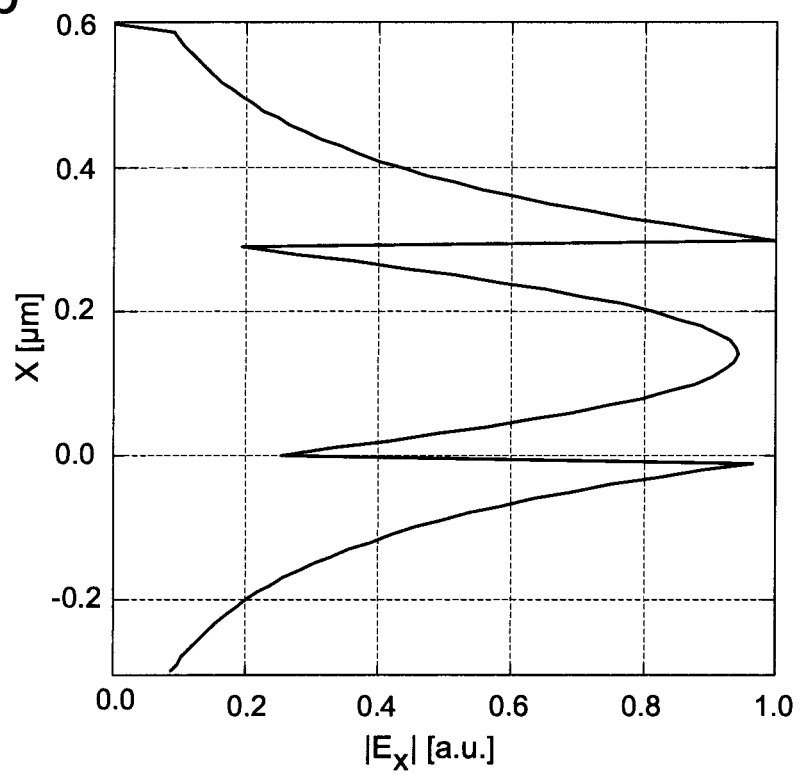

Results obtained via mode analysis of electric field Ex in waveguide 200 are shown in FIGS. 7a and 7b. A finite differential method (FDM: Finite Differential Method) was used for analysis.

The amplitude of electric field Ex is shown with contour lines in FIG. 7a, and the profile of electric field |Ex| on X-Z cross-sectional surface at Y=0 is shown in FIG. 7b. Any of the contour lines and the profile is represented by the value normalized by setting the maximum amplitude value (absolute value) to 1. As is clear from FIGS. 7a and 7b, it is to be understood that a strong electric field is distributed near the boundary between core 203, and each of upper portion cladding 202 and substrate 201. The electric field intensity generated in a cladding portion near the boundary becomes large while relative refractive index difference Δ becomes large.

As to an electric field distribution, on the cross-sectional surface in the X direction shown in FIG. 7b, there are large discontinuous portions around the boundary between core 203, and each of upper portion cladding 202 and substrate 201. Presence of the discontinuous portions means a boundary condition of a component perpendicular to the interface of electric flux density derived by Maxwell's equations. From the following Equation (2): $\epsilon_{core} \cdot E_{core} = \epsilon_{cladding}$ (2), core side $E_{core}$ and cladding side $E_{cladding}$ of the X component of electric field at the boundary become the following Equation (3): $n_{core}^2 \cdot E_{core} = n_{cladding}^2 \cdot E_{cladding}$ (3), whereby this can be understood. By substituting each refractive index used for analysis this time, obtained is the following: $E_{cladding}/E_{core} = n_{core}^2/n_{cladding}^2 = 1/(1-2\times\Delta) = 5.61$; the resulting value roughly corresponds to the value read from the graph in FIG. 7b; and the relationship between $E_{core}$ and $E_{cladding}$ can be obtained by using Formula (2) without using an FDM method.

Figure 8A:
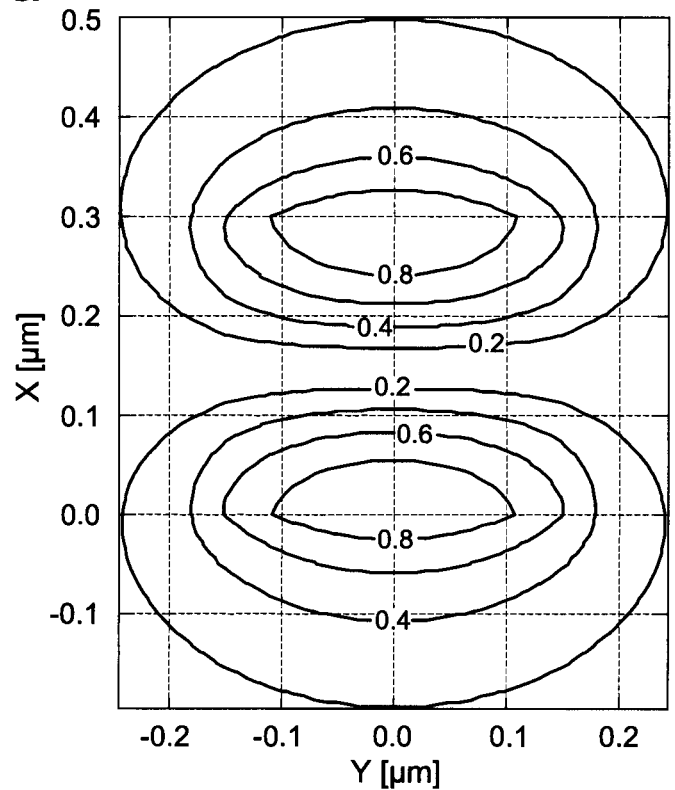
FIGS. 8a and 8b each are a diagram showing an intensity distribution of electric field Ez.
Figure 8B:
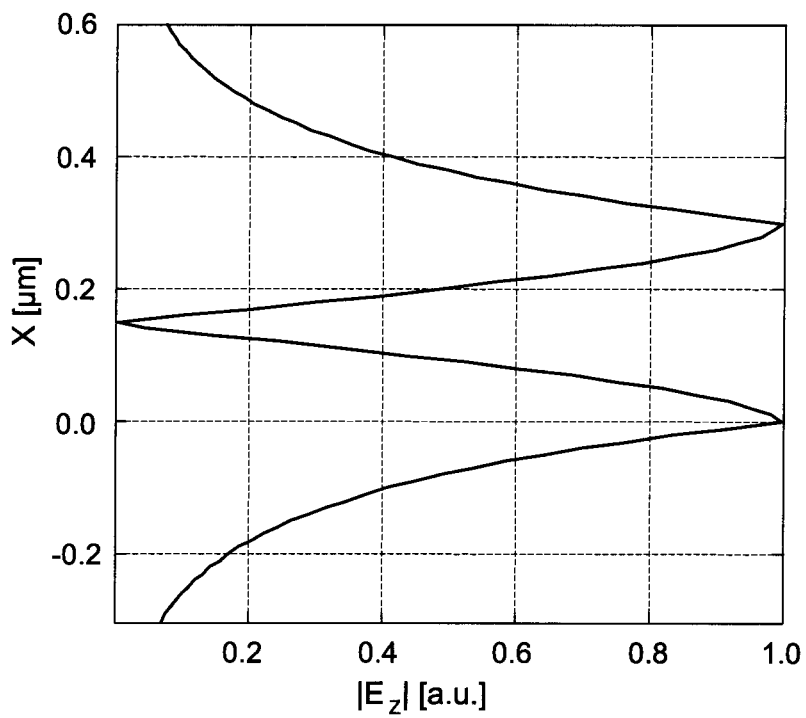

Results of mode analysis for electric field Ez are shown in FIGS. 8a and 8b. The intensity value of each of the contour lines and the profile is normalized similarly to the case of electric field Ex. It appears that the electric field Ez component in FIG. 8b is present in such a way that it protrudes from core 203 to substrate 201 and upper cladding 202.

It is understood from results obtained via mode analysis of electric field Ex and electric field Ez that strong electric intensity can be obtained on the cladding side near the boundary between core 203 and each of substrate 201 and upper portion cladding 202.

Incidentally, the mode field diameter of electric field is defined as a full width at 1/e of the maximum value of an electric field distribution |Ex| profile in the Y direction, resulting in 380 nm in the case of the present example.

The sharpened portion appearing to be capable of generating strongest near field light of a plasmon probe is present on cladding 202, and the plasmon probe is placed in such a way that it receives a strong electric field component near the boundary between core 203 and each of upper portion cladding 202 and substrate 201 explained referring to FIGS. 7a, 7b, 8a and 8b. In this way, strong near field light can be obtained by placing the plasmon probe. Those will be described below.

Electric field amplification m of the plasmon probe provided on the apical surface of waveguide 200 as described above was analyzed by a FDTD method (Finite Differential Time Domain Method). Electric field amplification m is determined by using the following Formula (4).

$$m = |Ehp|^2/|Enp|^2 \quad (4)$$

where Ehp: The maximum value of electric field in cases where a plasmon probe is provided, and the maximum value of electric field in cases where no plasmon probe is provided.

Figure 9:
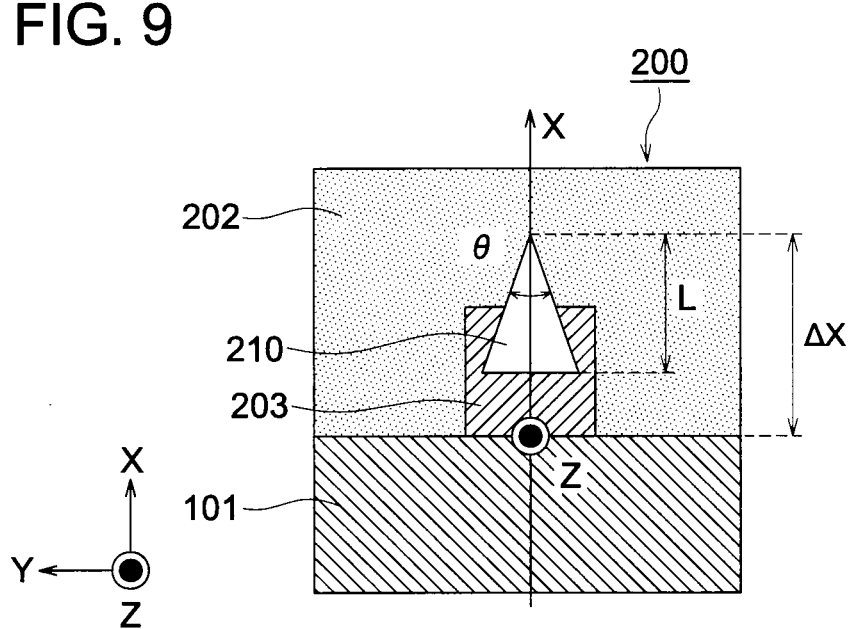
FIG. 9 is a diagram showing a light-outputting end face of a waveguide fitted with a plasmon probe for analysis.

As shown in FIG. 9, plasmon probe 210 used for analysis is in the form of an isosceles triangle having a length (height) L of 200 nm, an apex angle θ of 40° and a thickness of 40 nm, and its material is made of gold. Plasmon probe 210 is placed in such a way that the base of its triangle is parallel to the interface between substrate 201 and core 203 with respect to the apical surface of wavelength 200, and tip P is on X-axis to achieve ΔX=400 nm.

Figure 10:
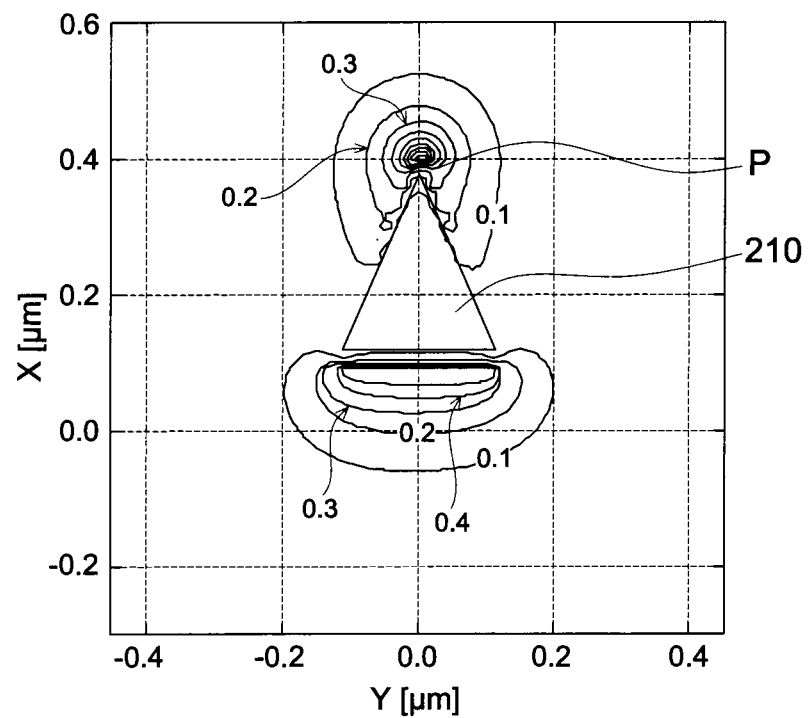
FIG. 10 is a diagram showing an electric field intensity on a light-outputting end face of a waveguide fitted with a plasmon probe.

A Drude model is used for a dispersing model of gold; a mesh for analysis is 10 nm in size; an observation point is placed on the X-Y plane at a distance of 10 nm flow the surface of plasmon probe 210; and analysis results are shown in FIG. 10. The values of contour lines in FIG. 10 represent values normalized by the maximum value.

As shown in FIG. 10, a light spot having strong intensity caused by a near field at tip P of plasmon probe 210 is present in upper portion cladding 202. It is confirmed that the half-value width of this light spot is small to be about 20 nm, and is usable for an optically assisted magnetic head for a high density recording of 1 Tbit/in$^2$ or more.

Figure 11:
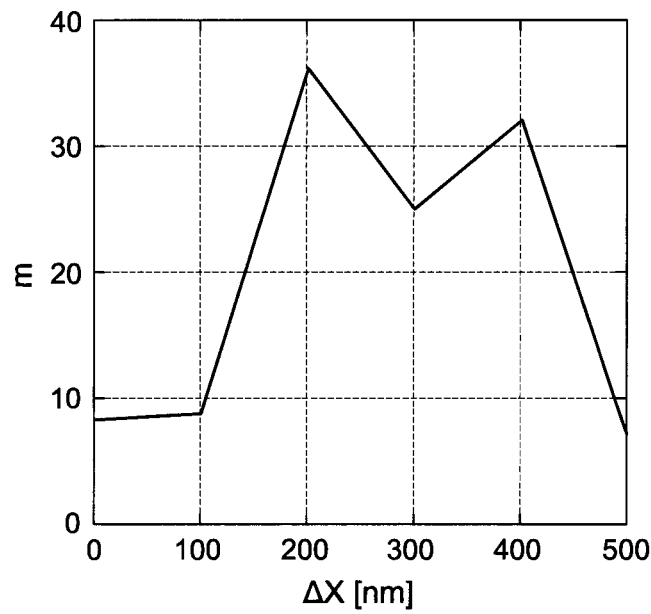
FIG. 11 is a diagram showing the relationship between the maximum electric field intensity at the end of a plasmon probe and the relative position between a waveguide and a plasmon probe.
Figure 12A:
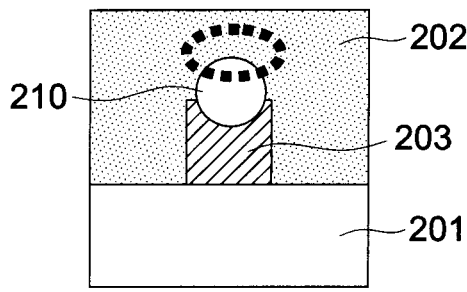
FIGS. 12a, 12b, 12c and 12d each are a diagram showing another example of the plasmon probe.
Figure 12B:
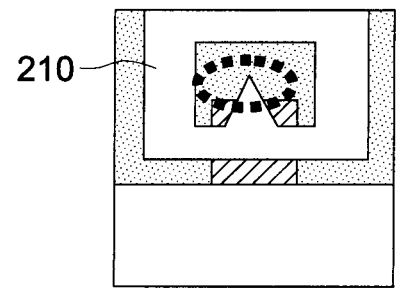
Figure 12C:
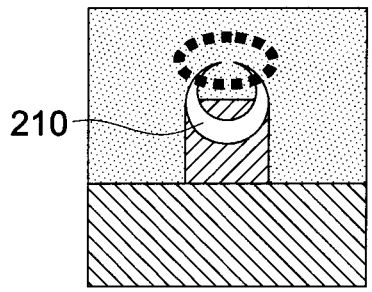
Figure 12D:
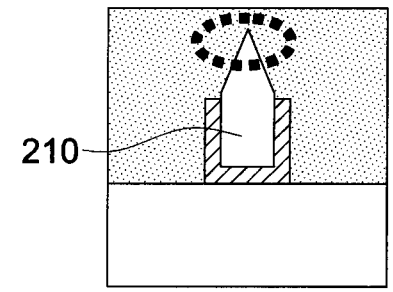

In FIG. 11, shown is a state of near field light intensity at tip P of plasmon probe 210 when plasmon probe 210 shown in FIG. 9 is displaced along X-axis from ΔX=0 to ΔX=50 nm.

In FIG. 11, the lateral axis represents relative displacement amount ΔX between waveguide 200 and plasmon probe 210 (refer to FIG. 9), and the vertical axis represents electrical field amplification m. For example, in the case of ΔX=300 nm, it is meant that there is tip P of plasmon probe 210 at the boundary between core 203 and upper portion cladding 202.

As shown in FIG. 11, it can be seen that ΔX=400 nm, that is, light emission intensity where tip P of plasmon probe 210 is protruded 100 nm on the positive X-axis side beyond the plasmon probe into upper portion cladding 202 is larger than in the case of the situation where plasmon probe 210 is placed so as to coincide with the core, and is roughly the same intensity as in the case of the situation where tip P of plasmon probe 210 is placed near the center of the core (ΔX=200 nm).

Accordingly, it is confirmed from analysis results having been described so far, that near field light having high intensity can be obtained in the vicinity of tip P of plasmon probe 210 by providing plasmon probe 210 in consideration of an electric field intensity distribution, and a location thereof is the location protruded in the X-axis direction on the upper portion cladding 202 side from the interface between core 203 and upper portion cladding 202.

In addition, when the electric field oscillation direction of light coupled with wavelength 200 is the Y-axis direction shown in FIG. 6, in the case of light irradiating the plasmon probe, Y component (Ey) and Z component (Ez) are main components. When plasmon probe 210 is provided, taking into account an electric field intensity distribution, similarly to the case of the X-axis direction shown in FIGS. 6a and 6b (the situation where 90° rotation of the plasmon probe is made in FIG. 9), near field light having high intensity is obtained in the vicinity of tip P of plasmon probe 210 in the electric field oscillation direction. In this case, the location where near field light having high intensity is obtained is the location protruded in the Y-axis direction on the upper portion cladding side beyond the interface between core 203 and upper portion cladding 202.

Gold as a material constituting the plasmon probe was described as an example, but other metal materials such as Ag, Al and so forth are usable. The shape of each of plasmon probe 24d and 210 is not limited to the above-described triangle shape, the shapes as shown in FIGS. 12a, 12b, 12c and 12d may be allowed to be used FIGS. 12a, 12b, 12c and 12d show circular shape, shape having a sharpened portion in the opening, shape having facing sharpened portions and pentagon shape having a sharpened portion, respectively. In addition, the sharpened portion of plasmon probe 210 preferably has a curvature radius of 20 nm or less, for example.

In cases where plasmon probes having shapes shown in FIGS. 12a, 12b, 12c and 12d are represented by a triangle-shaped plasmon probe described in FIG. 9, near field light having high intensity can be generated in the regions indicated by dotted lines in FIGS. 12a, 12b, 12c and 12d.

Next, the relative refractive index difference in the waveguide mode distribution will be explained. In this explanation, mode distribution analysis was conducted by using a two-dimensional slab waveguide as a model. In addition, waveguide 20b explained referring to FIG. 3 to FIG. 5 appears to be equivalent to the two-dimensional slab waveguide described below, and fundamental characteristics thereof can be explained by the following equations. "Photonics series HIKARI DOUHARO NO KISO" (K. Okamoto 1992, published by Corona publishing Co., Ltd.) was cited for analysis via application of a tow-dimensional slab waveguide as a model.

Figure 13:
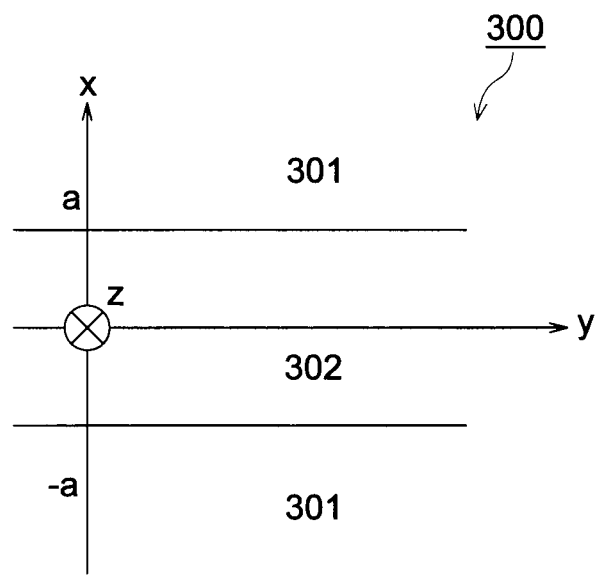
FIG. 13 shows a diagram in which a model of a two-dimensional slab waveguide is explained.

As to two-dimensional waveguide 300 as an analysis model shown in FIG. 13, the analytical solution of TM-mode (Hy, Ex, Ez) of a three layer symmetrical slab waveguide having a core 302 refractive index of $n_r$, a cladding 301 refractive index of $n_0$, and a core width of 2a is given by the following equations (5)-(11).

$$u^2+w^2=v^2=(n_1^2-n_0^2)k_0^2 a^2=2\Delta(n_1 k_0 a)^2) \quad (5)$$

$$w=n_0^2/n_1^2 \cdot u \tan[u-(m\pi/2)]=(1-2\Delta)\, u \tan[u-(m\pi/2)] \quad (6)$$

$$v=n_1 k_0 a \sqrt{2\Delta},\ \Delta=(n_1^2-n_0^2)/2n^2 [\approx (n_1-n_0)/n_1\ \text{for}\ n_1\sim n_0] \quad (7)$$

$$\beta^2=\tfrac{1}{2}(n_1^2+n_0^2)k_0^2-(u^2-w^2)/a^2,\ \varnothing=m\pi/2 \quad (8)$$

$$H_y=A\cos(u-\varnothing)\exp[-w/a\cdot(x-a)]\ \text{when}\ a<x;\ A\cos(u/a\cdot x-\varnothing)\ \text{when}\ x\leq|a|;\ \text{or}\ A\cos(-u-\varnothing)\exp[-w/a\cdot(-x-a)]\ \text{when}\ x<-a \quad (9)$$

$$E_x=\beta/\omega\epsilon_0\cdot A\cdot 1/n_0^2\cdot\cos(u-\varnothing)\exp[-w/a\cdot(x-a)]\ \text{when}\ a<x;\ \beta/\omega\epsilon_0\cdot A\cdot 1/n_1^2\cdot\cos(u/a\cdot x-\varnothing)\ \text{when}\ x\leq|a|;\ \text{or}\ \beta/\omega\epsilon_0\cdot A\cdot 1/n_0^2\cdot\cos(-u-\varnothing)\exp[-w/a\cdot(-x-a)]\ \text{when}\ x<-a \quad (10)$$

$$E_z=j/\omega\epsilon_0\cdot w/a\cdot A\cdot 1/n_0^2\cdot\cos(u-\varnothing)\exp[-w/a(x-a)]\ \text{when}\ a<x;\ j/\omega\epsilon_0\mu/a\cdot A\cdot 1/n_1^2\cdot\sin(u/a\cdot x-\varnothing)\ \text{when}\ x\leq|a|;\ \text{or}\ -j/\omega\epsilon_0\cdot w/a\cdot A\cdot 1/n_0^2\cdot\cos(-u-\varnothing)\exp[-w/a\cdot(-x-a)]\ \text{when}\ x<-a \quad (11)$$

Herein, $k_0$ represents a wavenumber in vacuum. Parameters u and w are determined in underspecification by relative refractive index difference Δ and normalised frequency v, employing the above-described equations. The cut-off condition where only one waveguide is present is v<π/2, and the minimum (m=0) mode as being v<π/2 will be described.

Figure 14:
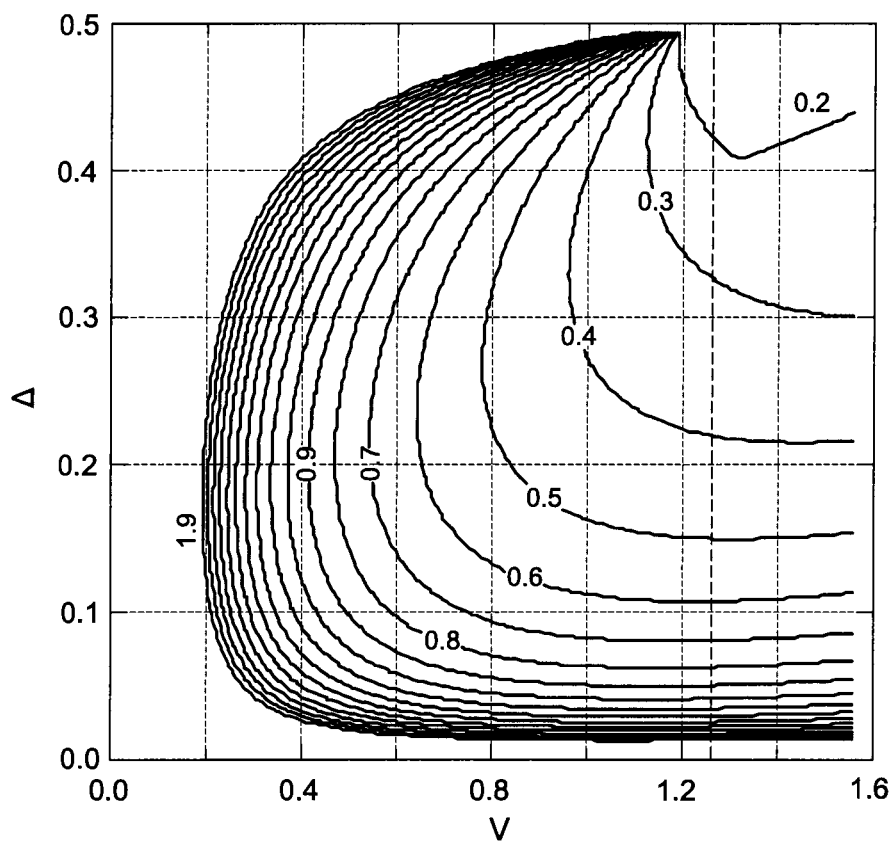
FIG. 14 shows a relationship between the normalized frequency and the relative refractive index difference in which a mode field diameter is taken as a parameter.

When wavelength λ is 1.5 μm, core refractive index $n_1$ is 3.48, thereafter, results produced by obtaining the relationship between relative refractive index difference Δ and normalized frequency v by using the mode field as a parameter are shown in FIG. 14.

It is understood from FIG. 14 that the mode field diameter is rapidly varied with respect to normalized frequency v at normalized frequency v lower than that in the cut-off condition, when relative refractive index difference Δ is 0.4 or more. From the foregoing, it is understood that as to a waveguide exhibiting a relative refractive index difference Δ of 0.4 or more, the mode field diameter becomes the smallest diameter in the vicinity of the single mode condition. Specifically, in order to minimize the mode field diameter to the smallest diameter in a single mode waveguide exhibiting a relative refractive index difference of 0.25 or more, it is preferred that the core width is 0.8 (the dashed line position in FIG. 14) to approximately 1.0 time larger than the core width at cut-off (v=π/2).

Figure 15:
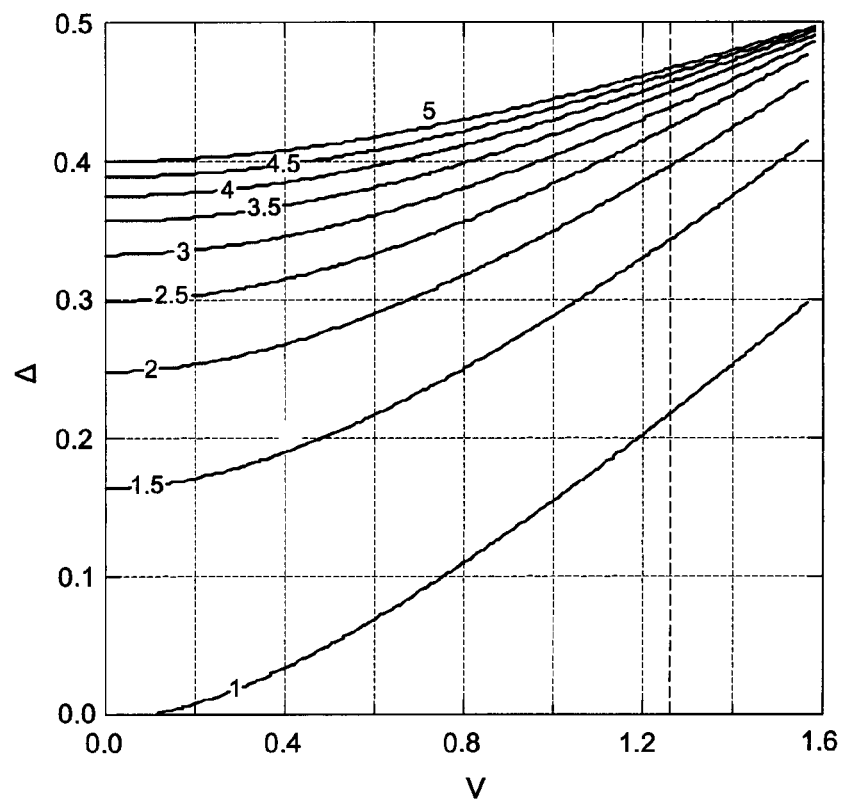
FIG. 15 shows another relationship between the normalized frequency and the relative refractive index difference in which a mode field diameter is taken as a parameter.

Results produced by obtaining the relationship between relative refractive index difference Δ and normalized frequency v by using electric field intensity ratio $E_R$ of electric field intensity in the core center {Ex (x=0)} to electric field intensity on the cladding side at the cladding boundary {Ex (x=a+0)} were shown in FIG. 15. In the range where normalized frequency v desired to make the mode field diameter to be the smallest diameter from FIG. 14 is 0.8 to 1.0 times larger than normalized frequency v at the cut-off, it is understood that relative refractive index difference Δ is sufficiently 0.25 or more in order to make electric field intensity in the cladding region to be equal to that in the core center (an electric field intensity ratio of 1), or larger than that in the core center from FIG. 15. This indicates that relative refractive index difference Δ between cladding 301 and core 302 constituting the waveguide is preferably 0.25 or more.

Figure 16:
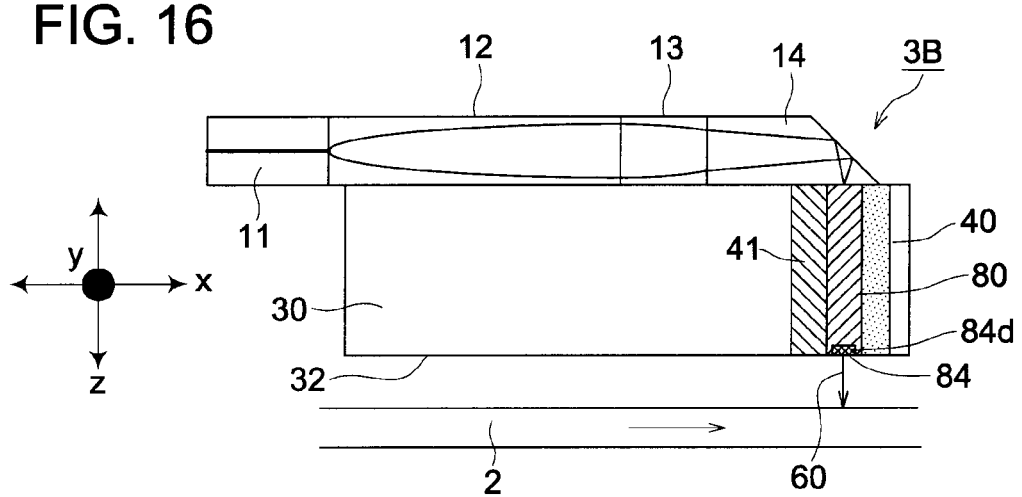
FIG. 16 shows the relationship between the normalized frequency and the relative refractive index difference in which a ratio of an electric field in the center of a core to another electric field at the boundary between the core and a cladding is taken as a parameter.

FIG. 16 shows optical recording head 3B as another example of optical recording head 3B. Optical recording head 3B possesses optical fiber 11 to guide light; waveguide 80 (composed of core 21 and cladding 22) to spot-heat recorded portions on disk 2 by near-infrared laser light; refractive index distribution type lenses 12 and 13 to guide near-infrared laser light emitted from optical fiber 11; an optical system composed of prism 14 as an optical path deflecting member, magnetic recording section 40 to write magnetic information onto recorded portions on disk 2; magnetic reproducing section 41 to read the magnetic information recorded on disk 2; and so forth.

Light guided by optical fiber 11 is, for example, light emitted from a semiconductor laser. Near-infrared laser light emitted from the end face of optical fiber 11 is collected onto the upper end surface of waveguide 80 by an optical system (refractive index distribution type lenses 12 and 13, and prism 14), and reaches apical surface 84 of the outputting plane of waveguide 80 provided in slider 30. Plasmon probe 84d similarly to above-described waveguide 20b is placed on apical surface 84, and disk 2 is exposed to near field light.

Figure 17:
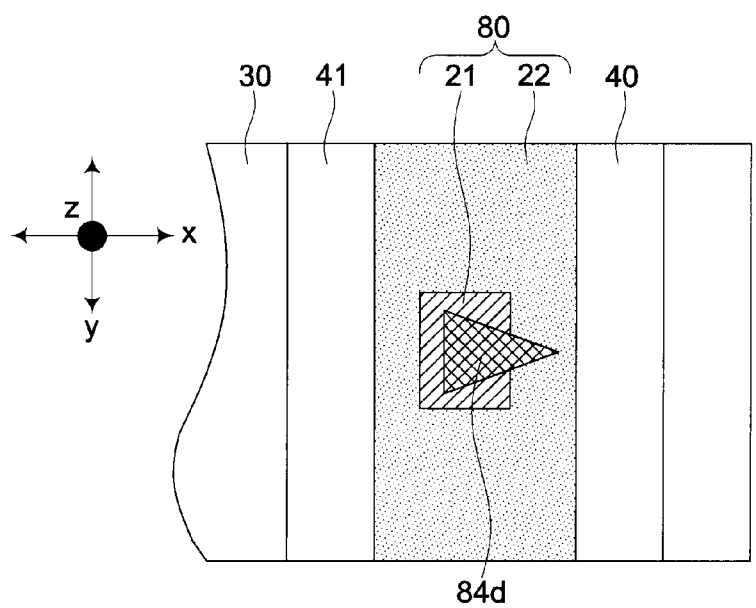
FIG. 17 is a cross-sectional view showing another example of an optical recording head.

A diagram viewing the light-outputting surface of waveguide 80 is shown in FIG. 17. Since FIG. 17 is similar to FIG. 5, and has almost the same content as in FIG. 5, the explanation will be omitted.

Optical fiber 11 is preferably designed to be a polarization maintaining fiber in such a way that an electric field of light entering waveguide 80 is placed in the X-axis direction, and the electric field direction is to be a predetermined direction.

When the relative refractive index difference between core 21 and cladding 22 which constitute waveguide 80, high accuracy is desired for aligning the light spot position during guidance of light into waveguide 80. In this case, waveguide 80 preferably possesses a light spot size converter.

For example, a subcore having a refractive index lower than that of the core and higher than that of the cladding is provided with the core on the light-incident side of waveguide 80 to form the light spot size converter. A light spot in larger size can be effectively coupled with waveguide 80 by providing the light spot size converter, whereby acceptable error in position alignment between the center of the incident light spot and the center of waveguide 80 can be increased. Further, a light spot size, wherein a plasmon probe is exposed to the light, can be reduced to approximately 0.5 μm in such a way that near field light can be effectively generated.

Figure 18A:
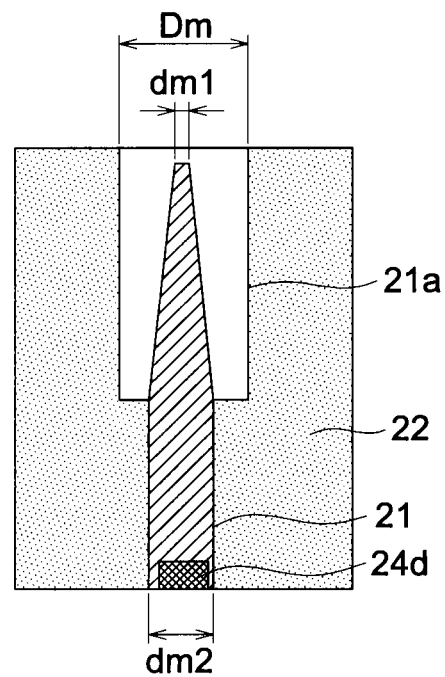
FIG. 18 is a diagram showing another example of a waveguide.
Figure 18B:
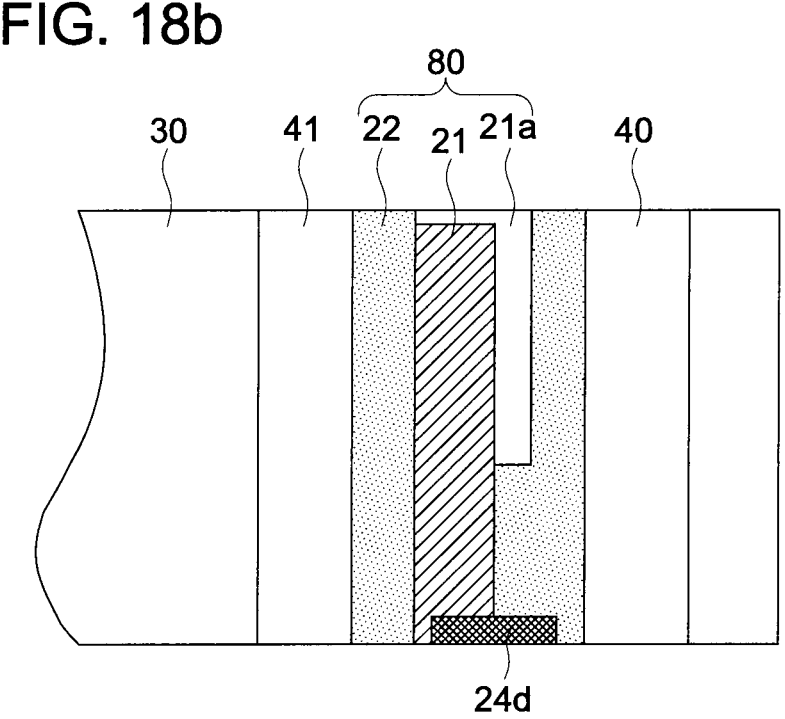

FIGS. 18a and 18b each are shown as an example of waveguide 80 with a light spot size converter. FIG. 18a shows a situation where waveguide 80 is viewed in the relatively moving direction of an optical head when recording (or reading), and from the direction parallel to the magnetic recording surface, and FIG. 18b schematically shows a situation where it is viewed in the direction perpendicular to the moving direction, and from the direction parallel to the magnetic recording surface.

Waveguide 80 shown in FIGS. 18a and 18b possesses core 21 (made of Si, for example), subcore 21a (made of SiON, for example), and cladding 22 (made of $SiO_2$, for example), and for example, designed is a structure where the spot size on the incident end side is converted in spot size from approximately 5 μm to hundreds of nanometers on the output end side.

The width of core 21 remains constant on the cross-section shown in FIG. 18b from the light incident side to the light output side, but in the case of the cross-section shown in FIG. 18a, it is varied in such a way that it is gradually broadened from the light incident side to the light output side in subcore 21a. A mode field diameter is converted via smooth change of this core width. The width of core 21 of core 21 of waveguide 80 in FIG. 18a is 0.1 μm or less (dm1) on the light incident side and 0.3 μm (dm2) on the light output side, but as shown in FIG. 18a, waveguide 80 having a mode field diameter of approximately 5 μm (Dm) is arrange to be made on the light incident side with subcore 21a. An optical spot having a mode field diameter of approximately 5 μm, entering from the light incident side, is optically coupled via gradual concentration of light from subcore 21a to core 21, leading to reduction of the mode field diameter, whereby the mode field diameter is converted into an optical spot having a mode field diameter of approximately 0.3 μm on the light output side.

The light spot coupled with a waveguide may be large in size when a light spot size converter is provided with the waveguide as described above, and further, the tolerable width in position alignment between the light spot and the waveguide can be increased in width.

EXPLANATION OF NUMERALS

1 Enclosure
2 Disk
3, 3A, and 3B Optical recording head
4 Suspension
20 Planar optical element
20a Diffraction grating
20b, 80, 200, and 300 Waveguide
21, 203, and 302, Core
21a Subcore
22, and 301 Cladding
24, and 84 Apical surface
26, and 27 Lateral face
30 Slider
32 Air bearing surface
40 Magnetic recording section
41 Magnetic reproducing section
50 Light source
51 Mirror
52, and 52a Light
55 Light spot
60 Near field light
100 Optical recording apparatus
24d, 84d, and 210 Plasmon probe
201 Substrate
202 upper cladding
C axis
F Focal point

The invention claimed is:

1. A near field light generator comprising:
   a waveguide comprising a core and a clad brought into contact with the core, to guide light comprising an electric field component perpendicular to an interface between the core and the clad, and
   a metallic structure body provided on an outputting end face onto which light of the waveguide is output, to generate near field light by receiving light guided by the waveguide,
   wherein the metallic structure body is placed straddling the core and the clad on the outputting end face in such a way that the metallic structure body receives the electric field component protruding from the interface to the clad, and wherein the metallic structure body comprises a sharpened portion in its shape, the sharpened portion being placed in such a way that the sharpened portion is present in the clad.

2. The near field light generator of claim 1, wherein specific refractive index difference Δ between refractive index $n_{core}$ of a material constituting the core and refractive index $n_{clad}$ of a material constituting the clad, represented by the following Formula, is 0.25 or more:

$$\Delta=(n_{core}^2-n_{clad}^2)/(2\times n_{core}^2).$$

3. The near field light generator of claim 1, wherein the waveguide comprises a light spot size converter to make a light spot on an output side of the waveguide to be smaller in size than another light spot on an incident side of the waveguide.

4. The near field light generator of claim 1, wherein the metallic structure body is in the form of a triangle, and placed in such a way that the triangle comprises an apex present in the clad, and an opposite side facing the apex is present in the core.

5. An optical recording head comprising:

the near field light generator of claim 1 placed to provide near field light to a magnetic recording medium, and a magnetic recording section placed to conduct magnetic recording onto the magnetic recording medium to which the near field light is provided by the near field light generator, wherein the metallic structure body is placed straddling from the core to a clad on a side where the magnetic recording section is located.

6. An optical recording apparatus comprising:

the optical recording head of claim 5, a light source emitting light coupled with the waveguide, a magnetic recording medium, and a control section to conduct controlling for magnetic recording onto the magnetic recording medium with the optical recording head.

* * * * *